Dec. 18, 1962 P. B. STEPHENS 3,068,925
TRACTION DEVICE FOR VEHICLE TIRES
Filed May 9, 1961
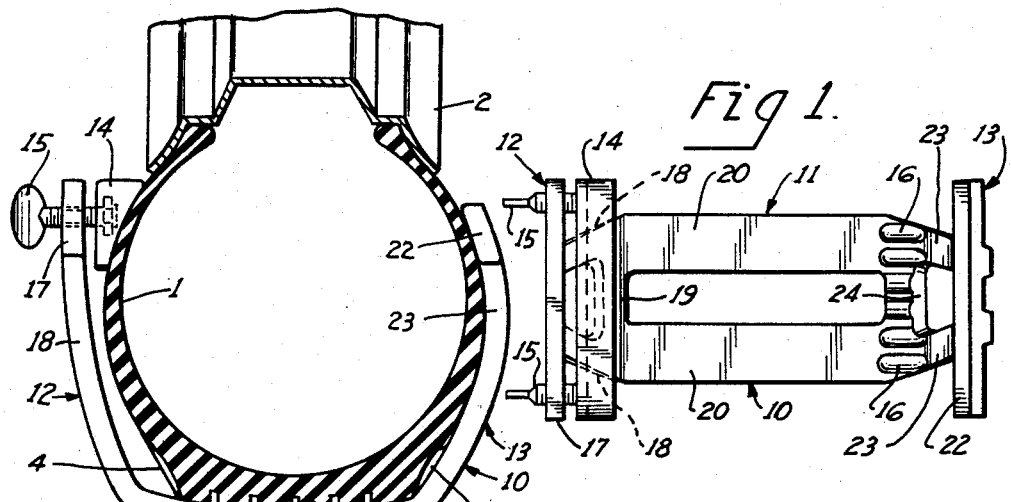
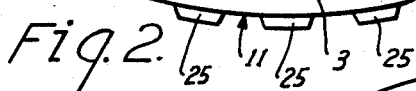
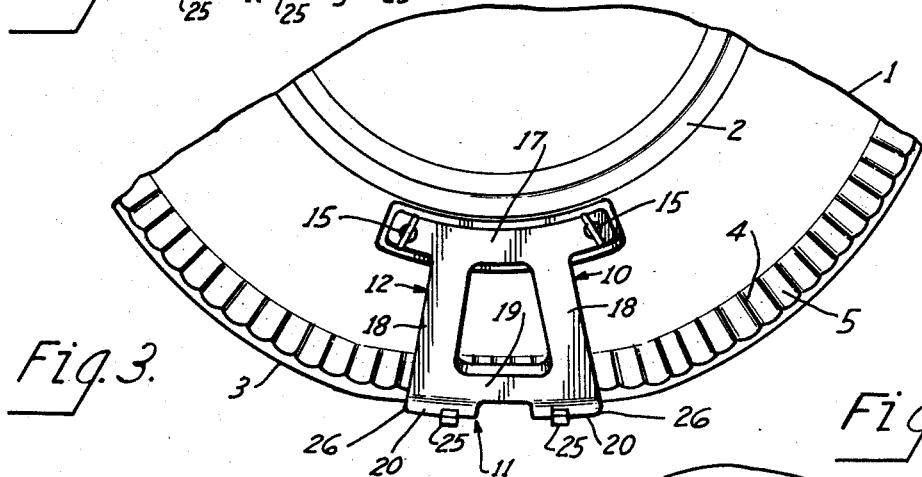
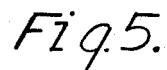
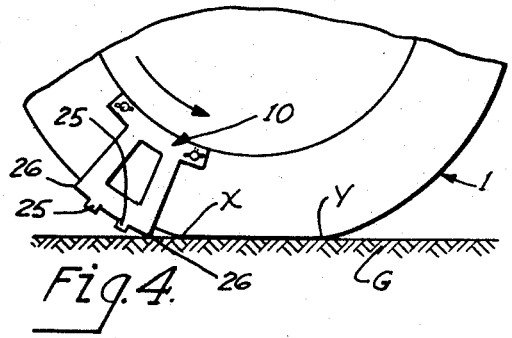
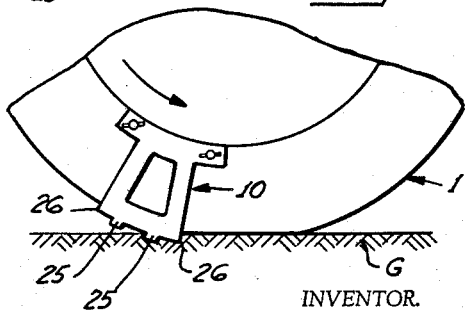
INVENTOR.
PAUL B. STEPHENS
BY
ATTORNEY.

United States Patent Office 3,068,925
Patented Dec. 18, 1962

3,068,925
TRACTION DEVICE FOR VEHICLE TIRES
Paul B. Stephens, 731 Mill St., Mount Vernon, Ind.
Filed May 9, 1961, Ser. No. 108,870
7 Claims. (Cl. 152—226)

This invention relates to a traction device for use on automobile tires, and particularly for use on tubeless tires.

Traction devices for attachment to wheels of automobiles have been provided heretofore. In general, they are adapted to be clamped to the rim of the wheel in embracing relation to a circumferentially limited portion of the tire so as to embrace that portion of the tire and lie between the tread and ground as that portion of the tire rolls along the ground. They are usually equipped with radially extending lugs which are of substantial depth radially of the tire and which dig into the ground or snow to provide increased traction for the wheel.

There are a number of objections to such structures. They are arranged to be detachably connected to the wheel rim, instead of to the tire, by a clamp. The lugs are arranged to engage the ground prior to the superposition of the weight of the automobile on the tire embracing portion of the traction device. As a result, the device and clamp each must withstand the strain of the entire reactive force of the wheel against the lug while the lug is firmly engaged in the ground.

Furthermore, the prior structures cannot readily be used for tubeless tires inasmuch as they require a high total clamping pressure to withstand the reactive force imposed on the clamp by the lugs and the wheel, and the clamps thereof are arranged to concentrate this already high clamping pressure on a small area of the wheel rim. This pressure, if concentrated against the side wall of the tubeless tire adjacent the wheel rim, would unseat at the opposite wall from the rim and permit escape of air.

The device of the present invention is one which can be installed and clamped into place readily on the tire itself from the outboard side of the wheel at that portion of the tire which is exposed between the roadway and the fender. It is detachably secured to the tire by a suitable clamp which applies and distributes its clamping pressure circumferentially of the tire adjacent the juncture of the tire side wall and periphery of the rim in such a manner that adequate total clamping pressure is maintained without serious concentration on the tire and without unseating the tire from the rim. When so secured, the traction device embraces a circumferentially limited portion of the tire and has a base or ground engaging portion juxtaposed against the ground engaging face of the tire tread.

The device is provided with internal lugs which engage flutes formed on the sides of the tire adjacent the base of the tread, thus preventing the device from rocking on the tire and also reducing the stress that must be withstood by the clamp.

A very important feature resides in the fact that the radially outward ground engaging surface of the base of the device is provided with exterior ground engaging radial lugs which are arranged so that they engage the ground in a manner to develope appreciable tractive force only after the weight of the automobile is imposed by the tire on the base of the device at the region of the lugs. As a result, the device as a whole and the clamp specifically are not subjected to the full reactive forces transferred to the lugs by the wheel as the wheel turns while the lugs are firmly embedded in the ground. Instead, these reactive forces between the wheel and lugs are resisted by frictional resistance between the superposed tire tread and the underlying inner face of the base of the device at the region of the lugs. A correlative advantage of this stress distribution is that the clamping force does not have to be as great as in the case of the prior wheel engaging structures.

Various other objects and advantages will become apparent from the following description wherein reference is made to the drawings, in which:

FIG. 1 is a top plan view of a traction device embodying the principles of the present invention;

FIG. 2 is a front elevation of the device, showing it installed on a tubeless tire, a portion of the tire and supporting rim thereof being shown in section;

FIG. 3 is a side elevation of the structure illustrated in FIG. 2;

FIG. 4 is a diagrammatic illustration showing the initial engagement of the device with the ground during its operation; and FIG. 5 is a diagrammatic illustration, similar to FIG. 4, showing the device when one of its traction lugs is embedded in the ground.

Referring to the drawing, the device is shown in connection with a pneumatic tubeless tire 1 mounted on an automobile rim 2 and having a conventional tread 3 and the usual ribs 4 and flutes 5 distributed along the sidewall of the tire adjacent the tread 3. This tire is one of a number of conventional tires available on the market.

The traction device itself comprises a body 10 having a tread engaging bottom portion or base 11 and side wall portions or arms 12 and 13, respectively. The body is generally of C-shape and is arranged to embrace a circumferentially limited portion of the tire 1 with the base portion 11 underlying the tread 3 of the tire for the full width thereof. Thus the base engages the ground and the tread is superposed thereon during revolution of the tire and device.

The arms 12 and 13 extend from the margins of the base upwardly, generally radially of the tire, so as to form with the base an open C-shaped shell which receives the tire radially between the open ends of the arms 12 and 13.

Clamp means are provided on the body for clamping the body in fixed circumferential position on the tire. For this purpose, a suitable clamping member 14 is provided. The member is of such length circumferentially of the tire that the clamping pressure applied to the tire by it is distributed over a large area which is elongated circumferentially of the tire. The clamping member 14 engages the outboard side wall of the tire adjacent the bead or rim of the wheel, but it is sufficiently rigid and sufficiently long so that the clamping pressure it applies is insufficient at any portion along the tire to unseat the sidewall from the rim and thereby cause the escape of air. The inboard face of the clamp is congruent to the engaged sidewall so as to further assure uniform distribution of the clamping pressure.

For applying the member 14 in clamping relation to the tire, a plurality of wing screws 15 are provided. They are spaced apart circumferentially of the wheel along the member 14 and are readily operable manually for effecting the clamping engagement between the member 14 and tire. Application of the clamp draws the opposite arm 13 firmly against the inboard sidewall of the tire.

The body 10 has internal ribs or lugs 16 which extend generally radially of the arm 13 and the tire, and which are spaced apart circumferentially of the tire so as to engage the flutes 5, between the ribs 4.

The arm 12 has an upper marginal portion 17 which is elongated circumferentially of the tire and extends therealong in spaced relation thereto. The arm 12 has two spaced portions 18 which diverge toward the base 11 of the device. At their lower ends, the portions 18 are tied together by a tie member 19.

The base 11 is in the form of two bands 20 which extend transversely of the tire tread and are spaced apart circumferentially of the tire. The arm 13 correspondingly is formed with an upper marginal portion 22 which is elongated circumferentially of the tire and fits the side wall of the tire adjacent the wheel rim. It is composed of two arm portions 23 which diverge downwardly and are tied together by a tie member 24.

Preferably all of the parts of the device, except for the wedge 14 and the screws 15, are integral with each other.

Each of the bands 20 is provided with radial lugs 25. These lugs are of such height and so set back from the edges of the bands 20, which lead in the direction of rotation of the tire, that upon rotation of the wheel in either direction, the leading edge 26 of the leading one of the bands 20 engages the ground and the weight of the auto is superposed on it before the associated lugs 25 engage the ground appreciably. Thus the base 11 of the device is frictionally bound firmly against the tire tread by the weight of the superposed vehicle before the lugs 25 dig into the ground sufficiently to produce any substantial reactive force in opposition to rotation of the wheel.

Thus, in FIG. 4, assuming a wheel is rotating in the direction indicated by the arrow, it is to be noted that the lowest portion of the tire is flat for a substantial distance, for example, between the limit lines $x$ and $y$.

As the device approaches the ground G, the outermost edge 26 of the band 20 which is leading in the direction of rotation strikes the ground before the lugs 25. This movement continues until the weight of the vehicle is superposed on the leading band 20 for an appreciable distance from its leading edge 26 toward its trailing edge. At this time, the leading lugs 25 engage the ground and dig thereinto so as to supply substantial reactive force opposing rotation of the wheel. By this time, however, the weight of the tire on the inner face of the base 11 develops sufficient frictional resistance to movement of the base 11 circumferentially relative to the tire that most of the reactive force of the lug is transmitted frictionally to the tire tread through the base 11, thus relieving the arms 12 and 13 and clamp means from high stresses. The fact that the base 11 is in the form of two circumferentially spaced bands 20 contributes to this result.

After the leading band 20 is well engaged with the ground, of course, continued rotation of the tire causes the trailing band 20 to become engaged before the leading one is released. As a result, the tractive force is not transferred through the clamping means and arms 12 and 13 to a high degree. They merely hold the base 11 in place initially so that it is carried beneath the tire somewhat the same as though a separate piece of material were shoved between the wheel and the ground and transferred force by friction from the tire to the ground. Not only does this relieve the clamping pressure from the strain of resisting the traction, but it also prevents it being pinched onto the tire in such a way as to damage the tire.

Further, the engagement of the ribs or lugs 16 with the flutes on the tire assist in the same operation and relieve the clamping means and arms from the forces imposed by the tractive resistance.

Due to the A-frame construction of the side portions, the weight of the tire is well distributed onto the base 11 of the device.

The device can be readily installed or removed without need for any special tool, while the tire is resting on the ground. Any number can be applied to a tire, as desired. The devices preferably are composed of tough set organic plastic material which is stiff, yet slightly flexible and resilient, so as to distribute strains and resist fracture.

Having thus described my invention, I claim:

1. A traction device for vehicle tires comprising a body having a rigid base adapted for overlying engagement with a tire tread, rigid arms thereon adapted to lie alongside opposite side walls of a tire while the base overlies the tread, means on the arms for clamping the body to a tire for rotation therewith, said base comprising two portions spaced apart in the direction of rotation, each portion extending transversely of the direction of rotation, ground engaging lug means on each portion, the portions being spaced in said direction of rotation a distance such that the portion leading in the direction of rotation remains in engagement with the ground until the portion trailing engages the ground, the leading portion having an outer leading ground engaging surface between its leading edge and those of its lug means nearest the leading edge, said leading surface leading its lug means in the direction of rotation and arranged to engage the ground firmly under the weight of a vehicle prior to substantial gripping engagement of its lug means with the ground, and the trailing portion having an outer trailing ground engaging surface between its trailing edge and those of its lug means nearest said trailing edge, said trailing surface trailing in the direction of rotation and arranged to engage the ground firmly under the weight of the vehicle prior to disengagement of its lug means from the ground.

2. The traction device according to claim 1 wherein said portions are two spaced bands, and the base is open and unobstructed between the portions for affording direct contact for the tire tread with the ground.

3. A traction device for vehicle tires and comprising a generally C-shaped body having a relatively rigid base adapted to overlie a tire tread for the full width of the tread, and having lateral arms rigid therewith and extending therefrom and adapted to lie alongside the side walls of the tire, respectively, clamp means carried by at least one of the arms for clamping the body to a tire for rotation therewith, said base having outwardly extending ground engaging lugs in fixed position thereon at its outer face and an outer leading portion between its leading edge and the lugs nearest to said edge and leading the last mentioned lugs in the direction of rotation and arranged to engage the ground firmly under the weight of the vehicle prior to substantial traction engagement of the last mentioned lugs with the ground, and said base having an outer trailing portion between its trailing edge and the lugs nearest to said trailing edge arranged to engage the ground firmly under the weight of the vehicle subsequent to engagement of the outer leading portion and to remain in said engagement with the ground until the lugs on the body cease their traction gripping engagement with the ground.

4. A traction device according to claim 3 wherein the body is composed of tough set organic plastic material which is stiff, yet slightly flexible and resilient.

5. A traction device according to claim 3 wherein said arms each comprises a top margin elongated circumferentially of the tire, forwardly and rearwardly spaced arm portions connected to the margin and diverging therefrom toward, and connected at their outer ends to, the base, and a tie portion between the lower ends of the arm portions of each arm.

6. A traction device according to claim 5 wherein the base is in the form of two bands, each of which is connected at one of its ends to one arm and at the other of its ends to the other arm, one band connecting the lower ends of the forward arm portion of the arms and the other band connecting the lower ends of the rearward arm portion, the bands are spaced from each other in a direction circumferentially of a tire distance such that the one band leading in the direction of rotation remains in engagement with the ground until the one trailing in the direction of rotation is in engagement with the ground and each band is provided with some of said ground engaging lugs.

7. A traction device for vehicle tires and comprising a generally C-shaped body having a relatively rigid base adapted to overlie a tire tread for the full width of the tread and having lateral arms rigid therewith and extending therefrom and adapted to lie alongside the sidewalls of the tire, respectively, each of said arms comprising a top margin elongated circumferentially of the tire, forwardly and rearwardly spaced arm portions connected to the margin and diverging therefrom toward, and connected at their outer ends to, the base, and a tie portion between the lower ends of the arm portions, clamp means carried by at least one of the arms for clamping the body to a tire for rotation therewith, said base having outwardly extending ground engaging lugs in fixed position thereon at its outer face, spaced from the leading and trailing edges of the base, and said body being composed of tough set organic plastic material which is stiff, yet slightly flexible and resilient.

References Cited in the file of this patent

UNITED STATES PATENTS

| | | |
|---|---|---|
| 1,413,167 | Knisely | Apr. 18, 1922 |
| 1,914,760 | Stiles | June 20, 1933 |
| 2,007,843 | Woolgar | July 9, 1935 |
| 2,113,343 | Frisina | Apr. 5, 1938 |
| 2,505,711 | Hughes | Apr. 25, 1950 |
| 2,864,423 | Lotz | Dec. 16, 1958 |